United States Patent
Bagozzi et al.

(10) Patent No.: US 8,610,552 B2
(45) Date of Patent: Dec. 17, 2013

(54) TIRE PRESSURE MONITORING SYSTEM INITIALIZATION USING MOVING ANTENNA

(75) Inventors: Norm Bagozzi, Dublin, OH (US); John Hays, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 246 days.

(21) Appl. No.: 13/077,645

(22) Filed: Mar. 31, 2011

(65) Prior Publication Data

US 2012/0249320 A1    Oct. 4, 2012

(51) Int. Cl.
    *B60C 23/00* (2006.01)
(52) U.S. Cl.
    USPC .. 340/447; 340/442; 340/426.33; 340/426.17
(58) Field of Classification Search
    USPC .......... 340/447, 442, 426.33, 825.72, 426.17; 700/115
    See application file for complete search history.

(56) References Cited

U.S. PATENT DOCUMENTS

| | | | |
|---|---|---|---|
| 6,804,999 B2 | 10/2004 | Okubo | |
| 6,906,624 B2 | 6/2005 | McClelland et al. | |
| 7,088,226 B2 | 8/2006 | McClelland et al. | |
| 7,231,274 B2 * | 6/2007 | Moulds et al. | 700/115 |
| 7,564,344 B2 | 7/2009 | Deniau et al. | |
| 7,623,025 B2 | 11/2009 | Miller | |
| 2006/0158324 A1 * | 7/2006 | Kramer | 340/447 |
| 2007/0090928 A1 * | 4/2007 | Deniau et al. | 340/10.52 |

* cited by examiner

*Primary Examiner* — Hoi Lau
(74) *Attorney, Agent, or Firm* — Standley Law Group LLP

(57) ABSTRACT

A system and method of initializing a vehicle TPMS using a moving TPMS antenna that tracks vehicle movement over some distance. Data received from the moving TPMS antenna is transmitted to a central data storage device. Stored TPMS data is subsequently retrieved by a downstream device connected to a controller of a vehicle TPMS and TPMS information is written to the controller, which may be the vehicle ECU.

23 Claims, 2 Drawing Sheets

TIRE PRESSURE MONITORING SYSTEM INITIALIZATION USING MOVING ANTENNA

TECHNICAL FIELD

The present invention is directed to the initialization of a vehicle tire pressure monitoring system and, more particularly, to the initialization of the individual sensors that are a part of the tire pressure monitoring system.

BACKGROUND

Many vehicles now include a tire pressure monitoring system (TPMS) that monitors the air pressure in the tires of the vehicle and reports the tire pressure and/or an under-inflation condition to the driver. While different TPMS designs exist, it is most common for a TPMS to employ an internal or valve stem mounted sensor-transmitter (sensor) on each wheel, which sensor communicates tire pressure readings to a vehicle mounted receiver. Radio frequency (RF) transmission is typically the means by which the TPMS sensors communicate with the receiver.

Because the sensors transmit RF signals to the receiver, the sensors are typically battery powered. Further, because it is obviously desirable to conserve battery life, a TPMS sensor is normally not energized until after a wheel into which the sensor has been installed is mounted to a vehicle. In the case of new vehicles, a TPMS sensor initialization process is commonly employed at some point during vehicle manufacture.

Known TPMS sensor initialization processes typically use one or, more commonly, a plurality of stationary antennas that are located along the path of an assembly area through which associated vehicles pass. As a vehicle passes the stationary antenna(s), the TPMS sensors are automatically activated, their data is read, and the data is subsequently written to the vehicle's engine control unit (ECU) or another vehicle-located control device. The use of a plurality of antennas arranged along the path of the vehicle is common in order to provide ample time to activate the sensors on all four wheels of a vehicle as it moves past the antennas. Antenna manufacturers require that the antennas remain stationary during the sensor initialization process to prevent any problems with RF communication between the antennas and the TPMS sensors.

Alternatively, TPMS sensor initialization may be accomplished with a hand-held wand that is independently placed in close proximity to each wheel of a vehicle. Although this method eliminates the need for multiple activation antennas, it requires a human user to walk around a vehicle and properly locate the wand to each wheel for an adequate time. Thus, while the number of activation antennas may be reduced, the time to perform the initialization process and the associated manpower is generally increased by this method.

Once the TPMS sensors of a vehicle have been activated, their data must be read and provided to a control unit in the vehicle. Commonly, TPMS sensor data is written to the vehicle's ECU. Thus, the assembly line area at which TPMS sensor initialization is performed is frequently also equipped with a remote receiver for receiving and recording data from the TPMS sensors of each vehicle, and a transmitter for transmitting the TPMS sensor data to the ECU or other controller located in the corresponding vehicle. In addition to requiring extra time to perform this portion of the TPMS initialization process and additional space for the central receiver(s), line-side remote transmission of TPMS sensor data to a vehicle's ECU may be problematic due to interference from other nearby TPMS initialization systems or other equipment in the area. Because of this, TPMS sensor initialization may occur off-line or in special assembly areas in some vehicle manufacturing facilities. Alternatively, a reduced line speed and special precautions and/or methods may be utilized to ensure proper sensor initialization and data transmission.

In light of the issues with known TPMS initialization systems and methods, it would be desirable to provide a system and method of activating vehicle TPMS sensors that reduces the time, space and number of antennas required to accomplish sensor initialization. It would also be desirable to reduce or eliminate problems associated with the transmission of TPMS sensor date to a vehicle ECU or other receiver.

SUMMARY OF THE GENERAL INVENTIVE CONCEPT

The present invention overcomes the aforementioned deficiencies of known TPMS initialization apparatus and methods. Contrary to conventional thinking, the present invention utilizes a moving antenna (or antennas) to activate the TPMS sensors of a vehicle during the vehicle manufacturing process. An antenna(s) is mounted to a motive device that tracks the movement of a vehicle along the assembly line. For example, an antenna(s) may be attached to a wheel installation machine or another piece of line-side equipment that moves with a vehicle as it passes a particular location on an assembly line. This eliminates the need to provide a plurality of spaced apart, stationary antennas along the path of vehicle travel, which conserves floor space and reduces TPMS sensor initialization system costs. TPMS sensor initialization according to the present invention may also be accomplished while a subject vehicle moves at normal assembly line speeds, thereby allowing TPMS sensor initialization to be performed at a number of potential assembly line locations and without a reduction in line speed.

In order to reduce or eliminate potential problems with transmitting/writing TPMS sensor data to a vehicle ECU or other receiver, and to reduce the time that must be uniquely allocated to TPMS initialization, TPMS sensor data is collected and stored at a designated storage location (e.g., a server) according to the present invention. Subsequently, at a downstream assembly location/process during which a Line End Tester (LET) is normally connected to the vehicle for other purposes, the LET will wirelessly and automatically download from the server the TPMS sensor data for the vehicle to which it is connected, and will write that data to the vehicle's ECU. Thus, this portion of the TPMS initialization and programming process may occur without the need for additional line-side space and equipment. Overall TPMS initialization time is also reduced, as the TPMS sensor data may be written to a vehicle during the course of other processes.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
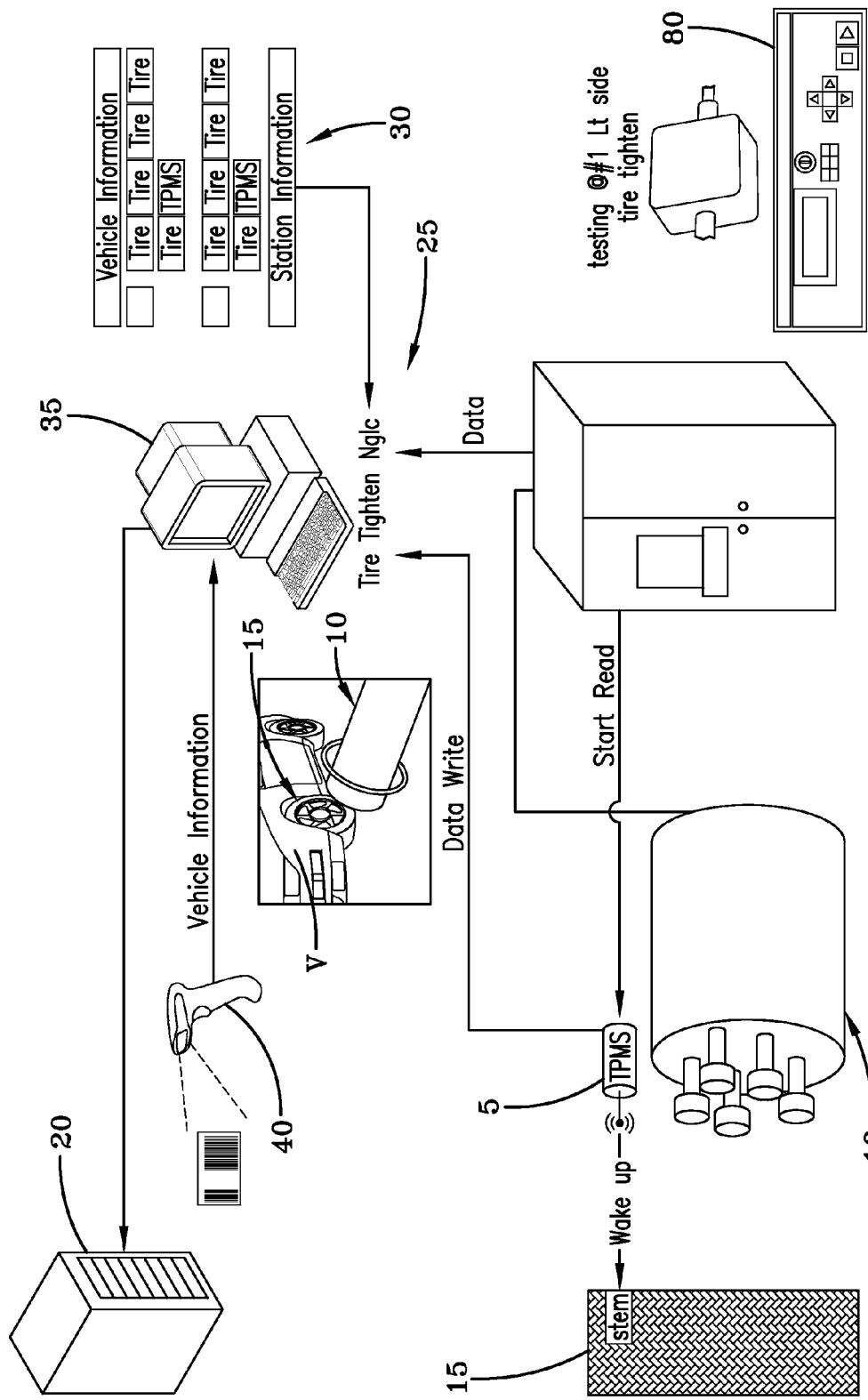
FIG. 1 schematically illustrates a read portion of a vehicle TPMS sensor initialization process according to the present invention during which a TPMS sensor is initialized and its data is received/read by a moving antenna.
Figure 2:
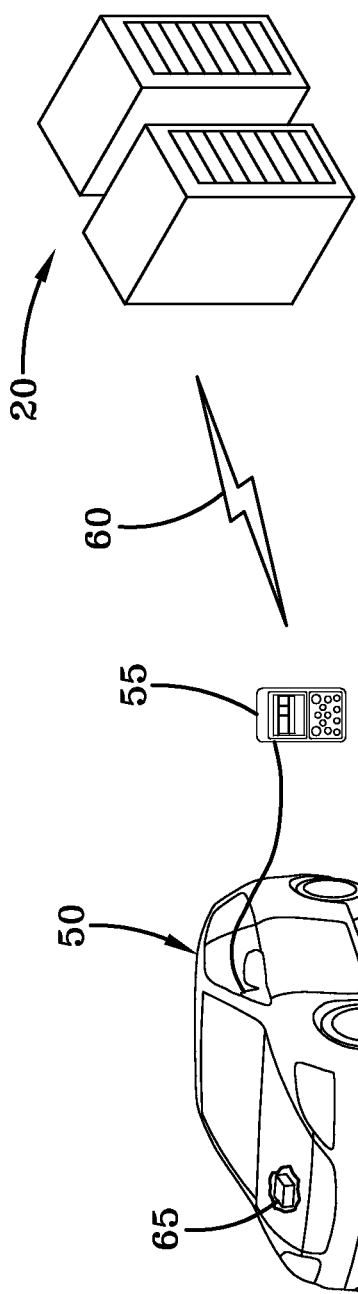
FIG. 2 schematically illustrates a write portion of a vehicle TPMS sensor initialization process according to the present invention during which TPMS sensor data is transmitted to and stored at a central storage location.

One exemplary embodiment of a TPMS sensor initialization system and method of the present invention is schematically illustrated in FIGS. 1-2. FIG. 1 represents a first stage of initializing a TPMS according to the present invention, wherein a TPMS sensor associated with a vehicle wheel is "woken up" (activated) and data from the sensor is read.

As shown in FIG. 1, a vehicle V travels along an assembly line in the area of a wheel installation operation. At this stage, a wheel/tire assembly 15 having an integrated TPMS sensor has been temporarily placed on a wheel hub of the vehicle V, and awaits final installation. A wheel lug nut installation device 10 is provided for this purpose. As would be understood by one of skill in the art, the wheel lug nut installation device 10 is used to simultaneously install the lug nuts to the threaded studs of a vehicle wheel hub so as to secure a wheel/tire assembly 15 thereto. The wheel lug nut installation device 10 moves with (tracks) a vehicle of interest for some distance as the vehicle travels along an assembly line.

A TPMS antenna 5 is secured to the wheel lug nut installation device 10 in this particular embodiment of the invention. Consequently, and in contrast to both known TPMS initialization systems and current thinking, the TPMS antenna 5 moves along with a vehicle of interest during a TPMS initialization operation. While a wheel lug nut installation device is a convenient device on which to install a TPMS antenna for purposes of the present invention, a TPMS antenna may be attached to other motive devices in other embodiments, which motive devices may be existing devices that naturally track vehicle movement or dedicated devices used specifically to move a TPMS antenna.

While the wheel lug nut installation device 10 is located near or engaged with the wheel/tire assembly 15, the TPMS antenna 5 initializes the TPMS sensor of the wheel/tire assembly in a manner that would be familiar to those of skill in the art. For example, the TPMS antenna 5 will typically wake up (activate) the TPMS sensor and receive data from the TPMS sensor.

In a most simplistic form, data received by the TPMS antenna 5 is transmitted directly or indirectly to a server 20 (which may be a remote server) or to some other acceptable storage device (e.g., database) for storage and subsequent retrieval. In the embodiment shown in FIG. 1, TPMS information may also be made available to an operator via the existing wheel lug nut installation device control system 25. For example, data received by the TPMS antenna 5 may be integrated into the displayed information 30 presented on the terminal of a wheel lug nut installation device station computer 35. The wheel lug nut installation device station computer 35 may also act as a conduit for the transfer of TPMS data to the server 20. TPMS data may be transferred to the station computer 35 or to the server 20 from a TPMS controller 80, such as a TPMS controller available from ATEQ Corp. in Livonia, Mich. The TPMS data transfer may be a wired (e.g., serial) or wireless communication.

TPMS initialization data may also be tagged with other useful information, such as vehicle information, station information, etc. Vehicle and other information may be provided in various ways that would be familiar to one of skill in the art, such as, for example, through the use of bar code scanning 40. Use of a wheel lug nut installation device station computer 35 as a conduit to the server 20 may also facilitate association of a vehicle identification number (VIN) with given TPMS data, as the station computer typically contains this information.

As should be apparent, either a TPMS antenna 5 associated with a single wheel lug nut installation device 10 is used to activate the TPMS sensors of both wheel/tire assemblies 15 on one side of a vehicle, or a separate TPMS antenna and associated wheel lug nut installation device may be provided for the front and rear wheel/tire assemblies of a given vehicle side. In the particular exemplary embodiment shown, a single moving TPMS antenna 5 is associated with a single wheel lug nut installation device 10 for this purpose. In either case, however, it should also be apparent that a like or similar apparatus is used to activate the TPMS sensors of the wheels on the opposite side of the vehicle.

As previously mentioned and as would be understood by one of skill in the art, the data received from the activated TPMS sensors of a given vehicle must be eventually provided to the ECU or some other control device associated with the TPMS of the vehicle. Such an exemplary data write process according to the present invention is schematically depicted in FIGS. 2-3.

As shown in FIG. 2, data previously received by the TPMS antenna 5 from the TPMS sensors of a vehicle 50 is stored on a server 20 or on some other accessible storage device. More realistically, TPMS data from the sensors of a multitude of vehicles is stored on the server 20 so as to be retrievable or otherwise accessible for some period of time. The TPMS data is subsequently retrieved from the server 20, typically at a downstream assembly location/process during which a Line End Tester (LET) 55 is normally connected to the vehicle 50 for other purposes. This connection of a LET to a vehicle may occur, for example, via the vehicle's OBDII port, which allows for communication between the LET 55 and the vehicle ECU 65. The general use of LETs should be well known to one of skill in the art.

Communication between the LET 55 and the server 20 may be wired or wireless in nature. In this particular exemplary embodiment, the LET 55 is in wireless communication 60 with the server 20. The LET 55 is programmed to automatically download from the server 20 the previously stored TPMS sensor data for the vehicle 50 to which it is connected. As mentioned previously, the TPMS data may be tagged or associated with vehicle identification information to ensure that the retrieved TPMS data properly corresponds to the vehicle 50 to which the LET 55 is connected. Once the proper data is retrieved from the server 20, the LET 55 will automatically write the appropriate information to the vehicle's ECU 65.

Figure 3:
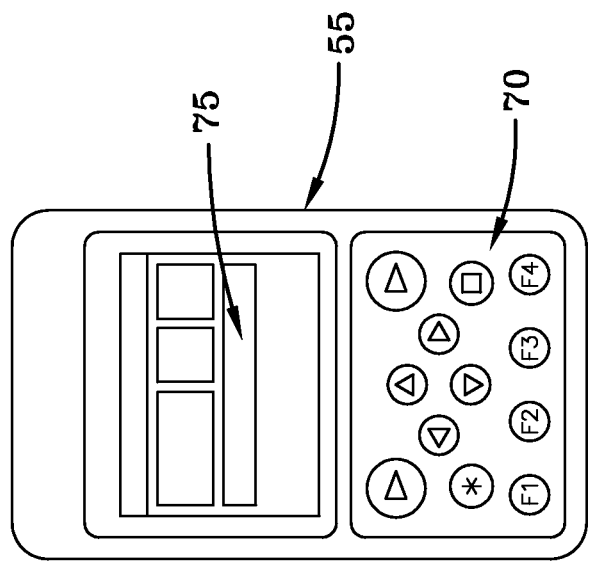
FIG. 3 depicts an exemplary Line-End-Tester (LET) device that may be used according to the present invention to retrieve TPMS data and to write TPMS information to a vehicle-located TPMS controller.

An exemplary LET 55 that can be used with the present invention is shown in FIG. 3. The LET 55 is provided with a cable that permits its connection to a vehicle of interest, such as via the vehicle's OBDII port. In addition to its other functions, the LET 55 is specifically programmed for communication with the server 20, to retrieve data from the server, and to write information to the vehicle ECU 65 or another controller or other device associated with the TPMS of the vehicle 50. Each step of the write process may occur automatically once initiated, or the program may wait for user authorization as it moves through the steps of the write process. This particular LET 55 also includes a number of function keys 70 and a display 75 that allows the LET 55 to report information to a user. For example, and without limitation, when running a TPMS program the display 75 of the LET 55 may be used to present a user with information such as the vehicle serial number, vehicle model, TPMS sensor status (pass/fail), tire pressure deviation allowance, temperature, and TPMS sensor battery status. Some or all of the same information may be provided to the vehicle ECU 65. The LET 55 may store this information for some period of time or the information may be wholly transient.

In other embodiments of the present invention, another device may be substituted for the LET 55 shown and described herein. For example, a non-LET device capable of communicating with a TPMS controller (e.g., vehicle ECU) and programmed to perform the above-described write process may be used instead.

In any case, it can be understood from the foregoing description that the TPMS initialization and write process of the present invention may be accomplished without the need for additional line-side space and equipment. Overall TPMS initialization time is also reduced, as the TPMS sensor data may be written to a vehicle during the course of other processes.

While certain embodiments of the present invention are described in detail above, the scope of the invention is not to be considered limited by such disclosure, and modifications are possible without departing from the spirit of the invention as evidenced by the following claims:

The invention claimed is:

1. A vehicle TPMS initialization system, comprising:
    a pathway along which vehicles of interest pass;
    a moving TPMS antenna located along said pathway, said TPMS antenna attached to a device that is adapted to track the movement of a vehicle for some distance as the vehicle travels along said pathway, said TPMS antenna adapted to initialize a TPMS sensor associated with a tire of said moving vehicle, said TPMS antenna further adapted to directly or indirectly transmit data received from a TPMS sensor to a central data storage device;
    a central data storage device for receiving and storing TPMS data transmitted by said moving TPMS antenna; and
    a downstream device adapted for direct or indirect connection to a vehicle-located controller associated with the vehicle's TPMS, to retrieve stored TPMS data for a given vehicle from said central data storage device, and to write selected TPMS information to said vehicle-loaded controller.

2. The system of claim 1, wherein said pathway is a vehicle assembly line.

3. The system of claim 1, wherein said moving TPMS antenna is comprised of a TPMS antenna mounted to a moving wheel lug nut installation device that tracks a vehicle as the vehicle travels along said pathway.

4. The system of claim 1, wherein two moving TPMS antennas are used, one TPMS antenna device adapted to initialize the TPMS sensors of a front and back tire on one side of a vehicle and the other TPMS antenna device adapted to initialize the TPMS sensors of a front and back tire on the other side of a vehicle.

5. The system of claim 1, wherein four moving TPMS antennas are used, one pair of TPMS antenna devices adapted to respectively initialize the TPMS sensor of a front and back tire on one side of a vehicle and the other pair of TPMS antenna devices adapted to respectively initialize the TPMS sensors of a front and back tire on the other side of a vehicle.

6. The system of claim 1, wherein said central data storage device is a server.

7. The system of claim 1, wherein said downstream device is a line-end-tester (LET).

8. The system of claim 7, wherein said LET is programmed to both automatically retrieve stored TPMS data for a given vehicle from said central data storage device and to automatically write selected information to a vehicle TPMS controller once a TPMS program of said LET is initiated.

9. The system of claim 1, wherein said controller is a vehicle ECU.

10. A vehicle TPMS initialization system for initializing the sensors of a vehicle TPMS during a vehicle manufacturing process, comprising:
    an assembly line along which travel vehicles being assembled;
    a TPMS antenna secured to a moving wheel lug nut installation device that tracks a vehicle over some distance as the vehicle travels along said assembly line, said TPMS antenna adapted to initialize a TPMS sensor associated with a tire of said moving vehicle, said TPMS antenna further adapted to directly or indirectly transmit data received from a TPMS sensor to a central server;
    a central server for receiving and storing TPMS data transmitted by said moving TPMS antenna; and
    a downstream line-end-tester device adapted for connection to an OBDII port of a vehicle, to wirelessly communicate with and retrieve stored TPMS data for a given vehicle from said central server, and to write selected TPMS information to an ECU associated with the vehicle.

11. The system of claim 10, wherein one wheel lug nut installation device and an associated TPMS antenna is located on either side of said assembly line, one TPMS antenna device adapted to initialize the TPMS sensors of a front and back tire on one side of a vehicle and the other TPMS antenna device adapted to initialize the TPMS sensors of a front and back tire on the other side of a vehicle.

12. The system of claim 10, wherein two wheel lug nut installation devices and associated TPMS antennas are located on either side of said assembly line, one pair of TPMS antennas adapted to respectively initialize the TPMS sensor of a front and back tire on one side of a vehicle and the other pair of TPMS antennas adapted to respectively initialize the TPMS sensors of a front and back tire on the other side of a vehicle.

13. The system of claim 10, further comprising at least one display device located in proximity to said moving TPMS antenna, said at least one display device displaying TPMS information received from initialized TPMS sensors.

14. The system of claim 13, wherein said display device is part of a control system for said wheel lug nut installation device.

15. A method for initializing a vehicle TPMS, comprising:
    moving vehicles of interest along a specific pathway;
    locating a moving TPMS antenna along said pathway, said TPMS antenna being separate from vehicles that travel along said pathway and adapted to track the movement of a vehicle for some distance as the vehicle travels along said pathway and to initialize a TPMS sensor associated with a tire of said moving vehicle, said TPMS antenna further adapted to directly or indirectly transmit data received from a TPMS sensor to a central data storage device;
    providing a central data storage device for receiving and storing TPMS data transmitted by said moving TPMS antenna; and
    using a downstream device that is directly or indirectly connected to a vehicle-located controller associated with the vehicle's TPMS, to retrieve stored TPMS data for a given vehicle from said central data storage device and to write selected TPMS information to said vehicle-located controller.

16. The method of claim 15, wherein said pathway is a vehicle assembly line.

17. The method of claim 15, wherein said moving TPMS antenna is comprised of a TPMS antenna mounted to a moving wheel lug nut installation device that tracks a vehicle as the vehicle travels along said pathway.

18. The method of claim 15, wherein said downstream device is a line-end-tester (LET), said LET programmed to both automatically retrieve stored TPMS data for a given vehicle from said central data storage device and to automatically write selected information to a vehicle TPMS controller once a TPMS program of said LET is initiated.

19. The method of claim 15, wherein said controller is a vehicle ECU.

20. A vehicle TPMS initialization system, comprising:
a pathway along which vehicles of interest pass;
a TPMS antenna mounted to a moving wheel lug nut installation device that tracks the movement of a vehicle for some distance as the vehicle travels along said pathway, said TPMS antenna adapted to initialize a TPMS sensor associated with a tire of said moving vehicle, said TPMS antenna further adapted to directly or indirectly transmit data received from a TPMS sensor to a central data storage device;
a central data storage device for receiving and storing TPMS data transmitted by said moving TPMS antenna; and
a downstream device adapted for direct or indirect connection to a vehicle-located controller associated with the vehicle's TPMS, to retrieve stored TPMS data for a given vehicle from said central data storage device, and to write selected TPMS information to said controller.

21. A vehicle TPMS initialization system, comprising:
a pathway along which vehicles of interest pass;
a moving TPMS antenna located along said pathway, said TPMS antenna adapted to track the movement of a vehicle for some distance as the vehicle travels along said pathway and to initialize a TPMS sensor associated with a tire of said moving vehicle, said TPMS antenna further adapted to directly or indirectly transmit data received from a TPMS sensor to a central data storage device;
a central data storage device for receiving and storing TPMS data transmitted by said moving TPMS antenna; and
a downstream device in the form of a line-end-tester (LET) that is adapted for direct or indirect connection to a vehicle-located controller associated with the vehicle's TPMS, and programmed to both automatically retrieve stored TPMS data for a given vehicle from said central data storage device and to automatically write selected TPMS information to said vehicle-located controller once a TPMS program of said LET is initiated.

22. A method for initializing a vehicle TPMS, comprising:
moving vehicles of interest along a specific pathway;
mounting a TPMS antenna to a moving wheel lug nut installation device that tracks the movement of a vehicle for some distance as the vehicle travels along said pathway, said TPMS antenna adapted to initialize a TPMS sensor associated with a tire of said moving vehicle, said TPMS antenna further adapted to directly or indirectly transmit data received from a TPMS sensor to a central data storage device;
providing a central data storage device for receiving and storing TPMS data transmitted by said moving TPMS antenna; and
using a downstream device that is directly or indirectly connected to a vehicle-located controller associated with the vehicle's TPMS, to retrieve stored TPMS data for a given vehicle from said central data storage device and to write selected TPMS information to said controller.

23. A method for initializing a vehicle TPMS, comprising:
moving vehicles of interest along a specific pathway;
locating a moving TPMS antenna along said pathway, said TPMS antenna adapted to track the movement of a vehicle for some distance as the vehicle travels along said pathway and to initialize a TPMS sensor associated with a tire of said moving vehicle, said TPMS antenna further adapted to directly or indirectly transmit data received from a TPMS sensor to a central data storage device;
providing a central data storage device for receiving and storing TPMS data transmitted by said moving TPMS antenna; and
using a downstream device in the form of a line-end-tester (LET) that is directly or indirectly connected to a vehicle-located controller associated with the vehicle's TPMS, and programmed to both automatically retrieve stored TPMS data for a given vehicle from said central data storage device and to automatically write selected TPMS information to said vehicle-located controller once a TPMS program of said LET is initiated.

* * * * *